United States Patent
Welchko et al.

(10) Patent No.: US 7,286,375 B1
(45) Date of Patent: Oct. 23, 2007

(54) DEAD-TIME COMPENSATION METHOD FOR ELECTRIC DRIVES

(75) Inventors: Brian A Welchko, Torrance, CA (US); Silva Hiti, Redondo Beach, CA (US); Steven E. Schulz, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/625,962

(22) Filed: Jan. 23, 2007

(51) Int. Cl.
   *H02M 1/12* (2006.01)
   *H02M 7/68* (2006.01)
   *H02M 7/44* (2006.01)

(52) U.S. Cl. .................. 363/41; 363/98; 363/132; 363/56.02

(58) Field of Classification Search .......... 363/41, 363/56.02, 56.03, 56.04, 132, 98
See application file for complete search history.

(56) References Cited

U.S. PATENT DOCUMENTS

| | | | |
|---|---|---|---|
| 5,671,130 A * | 9/1997 | Kerkman et al. | 363/41 |
| 5,942,876 A * | 8/1999 | Maekawa | 318/801 |
| 6,023,417 A * | 2/2000 | Hava et al. | 363/41 |
| 6,434,020 B1* | 8/2002 | Lambert et al. | 363/17 |
| 6,535,402 B1* | 3/2003 | Ying et al. | 363/41 |
| 6,678,180 B2* | 1/2004 | Matsuda | 363/132 |
| 6,714,424 B2* | 3/2004 | Deng et al. | 363/17 |
| 6,819,070 B2* | 11/2004 | Kerkman et al. | 318/434 |
| 6,847,532 B2* | 1/2005 | Villaret | 363/132 |
| 6,909,620 B2* | 6/2005 | Park et al. | 363/56.04 |

\* cited by examiner

*Primary Examiner*—Bao Q. Vu

(57) ABSTRACT

Methods and apparatus are provided for compensating for a deviation in voltage output of a phase leg inverter when dead-time periods are inserted to prevent shoot-through failures. The method includes determining a pulse width for an input signal to the inverter such that the inverter voltage output is a desired amount. The pulse width is based on the non-inverted or inverted pulse sequences of two carrier signals and the polarity of current through the inverter. An amount of pulse width is added to the input signal when the current is positive, and an amount of pulse width is subtracted from the input signal when the current is negative. An additional amount of pulse width is added to or subtracted from the input signal depending on whether the carrier signal sequence changes from a non-inverted signal to an inverted signal or changes from an inverted signal to a non-inverted signal, respectively.

20 Claims, 10 Drawing Sheets

US 7,286,375 B1

DEAD-TIME COMPENSATION METHOD FOR ELECTRIC DRIVES

TECHNICAL FIELD

The present invention generally relates to semiconductor devices, and more particularly relates to a phase leg inverter.

BACKGROUND OF THE INVENTION

Inverters (e.g., a phase leg inverter) are utilized for a variety of electrical applications. FIG. 1, for example, is a diagram of a prior art phase leg inverter 100 having a voltage rail 108 coupled to a ground rail 118. Voltage rail 108 generally includes a switch 110 coupled in parallel with a diode 115 and, ground rail typically includes a switch 120 coupled in parallel with a diode 125, wherein diodes 115 and 125 are anti-parallel with respect to one another. Moreover, voltage rail 108 and ground rail 118 include a node 130 disposed between them such that positive current flows from ground through diode 125 (or through switch 120 when ON), and negative current flows to a voltage source through diode 115 (or through switch 110 when ON) when switches 110 and 120 are simultaneously OFF.

In typical phase leg inverters, a blanking period is often needed to prevent a shoot-through failure of the phase leg caused by a simultaneously ON condition in switches 110 and 120 when switching ON either switch 110 or 120. This blanking period consists of a short duration of time where switches 110 and 120 are both OFF at the same time, and is commonly referred to as a "dead-time" period.

During dead-time periods, the output voltage of inverter 100 is determined by the polarity of the current flowing through the phase leg (i.e., as the current flows through one of diodes 115 or 125 to voltage rail 108 or ground 118, respectively). For example, current flowing through diode 125 (i.e., positive current ($i_a$>0)) produces zero voltage at node 130 with respect to ground rail 118. Similarly, current flowing through diode 115 (i.e., negative current ($i_a$<0)) produces a positive voltage at node 130 with respect to ground rail 118.

FIG. 2 is a timing diagram 200 illustrating a representation of a conventional method of inserting a dead-time period to prevent a shoot-through failure in inverter 100 for a non-inverted carrier signal. In FIG. 2, a line 240 represents a phase α modulating signal and a line 245 represents a non-inverted carrier signal. In an ideal switching pulse represented by a line 210 ("ideal pulse 210"), when carrier signal 245 is below phase α modulating function 240, switch 110 is switched ON, and is switched OFF when carrier signal 245 is above phase α modulating function 240. Similarly, in an ideal switching pulse represented by a line 220 ("ideal pulse 220"), when carrier signal 245 is above phase α modulating function 240, switch 120 is switched ON, and is switched OFF when carrier signal 245 is below phase α modulating function 240. Since it is desirable that switches 110 and 120 not be ON at the same time, a common technique provides a period of time where switches 110 and 120 are both OFF prior to switching ON either switch 110 or 120.

Lines 110' and 120' each represent a typical switching pulse ("pulse 110'" and "pulse 120'") including a dead-time period for switches 110 and 120, respectively. As illustrated in FIG. 2, at time $t_1$ (i.e., when carrier signal 245 changes from being above phase α modulating function 240 to being below phase α modulating function 240), switch 120 is switched OFF, as represented by the falling edge of pulse 120' (which is equally represented in ideal pulse 220). Also at time $t_1$, switch 110 should ideally be switched ON (as illustrated in ideal pulse 210); however, to compensate for the potential harm of both switches 110 and 120 being simultaneously ON, the switching ON of switch 110 is delayed a pre-determined amount of time. This delay is represented by the rising edge of pulse 110' occurring at a time after time $t_1$, which causes a dead-time period represented by box 260 ("dead-time 260"). Moreover, dead-time 260 causes switch 110 to be ON a shorter period of time than the ideal period of time represented by ideal pulse 210. This shorter period of ON time of switch 110 results in inverter 100 outputting an amount of voltage that deviates from the amount of output voltage inverter 100 would otherwise output if dead-time period 260 was not inserted.

Likewise, at time $t_2$ (i.e., when carrier signal 245 changes from being below phase α modulating function 240 to being above phase α modulating function 240), switch 110 is switched OFF, as represented by the falling edge of pulse 110' (which is equally represented in ideal pulse 210). Also at time $t_2$, switch 120 should ideally be switched ON (as illustrated in ideal pulse 220); however, to compensate for the potential harm of both switches 110 and 120 being simultaneously ON, the switching ON of switch 120 is delayed a pre-determined amount of time. This delay is represented by the rising edge of pulse 120' occurring at a time after time $t_2$, which causes a dead-time period represented by box 265 ("dead-time 265"). Moreover, dead-time 265 causes switch 120 to be ON a shorter period of time than the ideal period of time represented by ideal pulse 220. This shorter period of time results in inverter 100 outputting an amount of voltage that deviates from the amount of output voltage inverter 100 would otherwise output if dead-time period 265 was not inserted.

Notably, the current at node 130 determines the voltage output by inverter 100 when switches 110 and 120 are simultaneously OFF. Specifically, when the current at node 130 is negative, inverter 100 outputs a positive voltage. Moreover, when the current at node 130 is positive, the output of inverter 100 zero, with respect to ground rail.

FIG. 3 is a timing diagram 300 illustrating a representation of a known method of inserting a dead-time period to prevent a shoot-through failure of inverter 100 caused by a simultaneously ON condition for inverted carrier signals. In FIG. 3, lines 310 and 320 each represent an ideal switching pulse ("ideal pulse 310" and "ideal pulse 320") for switches 110 and 120, respectively. Similar to the discussion above, switches 110 and 120 should not be ON at the same time, and to prevent such an event from occurring, a period of time where switches 110 and 120 are both OFF prior to switching either switch 110 or 120 ON is inserted.

As illustrated in FIG. 3, at time $t_1$ (i.e., when an inverted carrier signal 345 ("carrier signal 345") changes from being below phase α modulating function 240 to being above phase α modulating function 240), switch 110 is switched OFF, as represented by the falling edge of pulse 110' (which is also equally represented in ideal pulse 310). At time $t_1$, switch 120 should ideally be switched ON (as illustrated in ideal pulse 320); however, to compensate for the potential harm of both switches 110 and 120 being simultaneously ON, the operation of turning ON switch 120 is delayed a pre-determined amount of time. This delay is represented by the rising edge of pulse 120' occurring at a time after time $t_1$, which causes a dead-time period represented by box 365 ("dead-time 365"). Moreover, dead-time 365 causes switch 120 to be ON a shorter period of time than the ideal period of time represented by ideal pulse 320. This shorter period of time results in inverter 100 outputting an amount of voltage that deviates from the amount of output voltage inverter 100 would otherwise output if dead-time period 365 was not inserted.

Likewise, at time $t_2$ (i.e., when carrier signal 345 changes from being above phase α modulating function 240 to being below phase α modulating function 240), switch 120 is switched OFF, as represented by the falling edge of pulse 120' (which is also equally represented in ideal pulse 320). At time $t_2$, switch 110 should ideally be switched ON (as illustrated in ideal pulse 310); however, to compensate for the potential harm of both switches 110 and 120 being simultaneously ON, the switching ON of switch 110 is delayed a pre-determined amount of time. This delay is represented by the rising edge of pulse 110' occurring at a time after time $t_2$, which causes a dead-time period represented by box 360 ("dead-time 360"). Moreover, dead-time 360 causes switch 110 to be ON a shorter period of time than the ideal period of time represented by ideal pulse 310. This shorter period of time results in inverter 100 outputting an amount of voltage that deviates from the amount of output voltage inverter 100 would otherwise output if dead-time period 360 was not inserted.

Similar to the non-inverted signal discussed with reference to FIG. 2, the current at node 130 determines the voltage output by inverter 100 when switches 110 and 120 are simultaneously OFF. Specifically, when the current at node 130 is negative, inverter 100 outputs a positive voltage. Moreover, when the current at node 130 is positive, the output voltage of inverter 100 is zero, with respect to ground rail.

FIG. 4 is a timing diagram 400 illustrating a representation of the voltage output of inverter 100 for non-inverted carrier signal 245 when method 200 is utilized to prevent a shoot-through failure. As illustrated, an ideal area 410 represents the voltage output (in volt•seconds) for an ideal inverter (i.e., an inverter not needing dead-time periods to prevent shoot-through failures), wherein the ideal inverter would begin outputting voltage when carrier signal 245 passes below phase α modulating function 240, and stop outputting voltage when carrier signal 245 passes above phase α modulating function 240.

As illustrated for inverter 100 (i.e., a non-ideal inverter) in FIG. 4, an area $110_{NP}$ represents the amount of voltage output of inverter 100 when dead-time periods 260 and 265 are inserted to prevent a shoot-through failure in inverter 100 with positive current at node 130. Similarly, an area $110_{NN}$ represents another area of voltage output of inverter 100 when dead-time periods 260 and 265 are inserted to prevent a shoot-through failure in inverter 100 with negative current at node 130. Comparing area $110_{NP}$ to ideal area 410 and area $110_{NN}$ to ideal area 410, it is evident that when inverter 100 implements the dead-time insertion method represented by timing diagram 200, the amount of volt•seconds inverter 100 outputs is different from the ideal amount.

FIG. 5 is a timing diagram 500 illustrating the voltage output of inverter 100 for inverted carrier signal 345 when method 300 is utilized to prevent a shoot-through failure. As illustrated, ideal areas $510_A$ and $510_B$ represent the voltage output (in volt•seconds) for an ideal inverter, wherein the ideal inverter would begin outputting voltage when carrier signal 345 passes below phase α modulating function 240, and stop outputting voltage when carrier signal 345 passes above phase α modulating function 240.

As illustrated in FIG. 5, areas $110_{IPA}$ and $110_{IPB}$ represent the amount of voltage output of inverter 100 when dead-time periods 360 and 365 are inserted to prevent a shoot-through failure for positive current at node 130. Similarly, areas $110_{INA}$ and $110_{INB}$ represent the amount of voltage output of inverter 100 when dead-time periods 360 and 365 are inserted to prevent a shoot-through failure for negative current at node 130. Comparing the sum of areas $110_{IPA}$ and $110_{IPB}$ to the sum of ideal areas $510_A$ and $510_B$, and the sum areas $110_{INA}$ and $110_{INB}$ to the sum of areas $510_A$ and $510_B$, it is evident that when inverter 100 implements the dead-time insertion method represented by timing diagram 300, the amount of volt•seconds inverter 100 outputs is different from the ideal amount.

Notably, for some applications of inverter 100 it is advantageous to at least occasionally invert the carrier pulse sequence, which also desirably includes periods of dead-time to prevent shoot-through failures. However, switching between non-inverted and inverted carrier signals, even occasionally, may present another problem since the transition between pulse sequence types may require an additional period of dead-time per cycle, in addition to the already one dead-time period per cycle methods represented by timing diagrams 200 and 300. Specifically, when the carrier pulse sequence changes from a non-inverted signal to an inverted signal or changes from an inverted signal to a non-inverted signal, an additional dead-time period should be inserted into the cycle to prevent a shoot-though failure.

With reference to FIG. 6, a timing diagram 600 illustrates a representation of a current method of inserting a dead-time period to prevent a shoot-through failure in inverter 100 when the carrier signal switches between carrier signal 245 and carrier signal 345. In FIG. 6, a line $610_P$ represents a typical switching pulse including dead-time periods for switch 110. As discussed above with reference to FIG. 2, switch 110 includes one dead-time period 260 per cycle for non-inverted carrier signal 245. Accordingly, each of cycles 1 and 3 includes one dead-time period 260 (which results in inverter 100 outputting a deviated amount of volt•seconds (see FIG. 4, area $110_{NP}$ compared to ideal area 410)). Moreover, as discussed above with reference to FIG. 3, switch 110 includes one dead-time period 360 per cycle for inverted carrier signal 345. Accordingly, cycle 2 includes one dead-time period 360 (which results in inverter 100 outputting a deviated amount of volt•seconds (see FIG. 5, area $110_{IPB}$ compared to ideal area $510_B$)).

As illustrated, however, when the carrier signal switches from carrier signal 245 to carrier signal 345 (i.e., transitions from cycle 1 to cycle 2), an additional dead-time period 660 is needed in cycle 2 to prevent a shoot-through failure since there is an additional transition of carrier signal 245 from being above phase α modulating function 240 to being below phase α modulating function 240 when the carrier signal changes from a non-inverted signal to an inverted signal. Dead-time period 660 results in a further deviated voltage output for inverter 100 in cycle 2 in addition to the deviated amount illustrated by area $110_{NP}$ in FIG. 4.

Similarly, a line $610_N$ represents the ON/OFF switching action of switch 120. As discussed above with reference to FIG. 2, switch 120 includes one dead-time period 265 per cycle for non-inverted carrier signal 245. Accordingly, each of cycles 1 and 3 includes one dead-time period 265 (which results in inverter 100 outputting a deviated amount of volt•seconds (see FIG. 4, area $110_{NN}$ compared to ideal area 410)). Moreover, as discussed above with reference to FIG. 3, switch 120 includes one dead-time period 365 per cycle for inverted carrier signal 345. This results in inverter 100 outputting a deviated amount of volt•seconds (see FIG. 5, area $110_{INA}$ compared to ideal area $510_A$).

As illustrated, however, when the carrier signal switches from carrier signal 345 to carrier signal 245 (i.e., transitions from cycle 2 to cycle 3), an additional dead-time period 665 is needed in cycle 3 to prevent a shoot-through failure since there is an additional transition of carrier signal 345 from being below phase α modulating function 240 to being above phase α modulating function 240 when the carrier signal changes from an inverted signal to a non-inverted signal 245. Dead-time period 665 results in a further deviated voltage output for inverter 100 in cycle 3 in addition to the deviated amount illustrated by area 110$_{NN}$ in FIG. 4.

Therefore, utilizing dead-time periods to prevent shoot-through failures in inverter 100 results in a deviation from the desired amount of volt•seconds output by inverter 100. In addition, the insertion of dead-time periods occurs regardless of whether the carrier signal is non-inverted or inverted, or the polarity of the current at node 130. Moreover, when the carrier signal transitions from a non-inverted to an inverted carrier signal or from an inverted to a non-inverted carrier signal, an additional dead-time period is needed to prevent shoot-through failures, which results in additional voltage output deviation for inverter 100. Accordingly, for inverter 100 to output a desired amount of output voltage, it is desirable to provide a compensation method that accounts for and corrects the voltage deviations resulting from the insertion of dead-time periods for both non-inverted and inverted carrier signals, as well as for situations where the carrier signal transitions between non-inverted and inverted signals. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Embodiments of the invention provide a method for compensating for dead-time in an inverter including a first switch and a second switch and a node disposed between the first switch and the second switch, the node including a current polarity. In one embodiment, the method comprises the steps of inserting a dead-time period prior to actuating ON the first switch and the second switch, pre-determining an amount of output in volt•seconds for the inverter, determining input signal including a pulse width for the inverter, wherein the output is based on the pulse width and the pulse width is based on a first carrier signal including a first pulse sequence, a second carrier signal including a second pulse sequence, wherein the first pulse sequence and the second pulse sequence are each one of a non-inverted pulse sequence and an inverted pulse sequence, and a polarity of current at the node, wherein the polarity is one of positive and negative, adding a first amount of pulse width to the input signal when the current polarity is positive, subtracting a second amount of pulse width from the input signal when the current polarity is negative, and determining if an additional amount of pulse width needs to be added to or subtracted from the input signal. In addition, embodiments of the invention include a computer-readable medium storing executable computer program instructions which, when executed by a processor, cause the processor to perform the method for compensating for dead-time in the inverter.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 7:
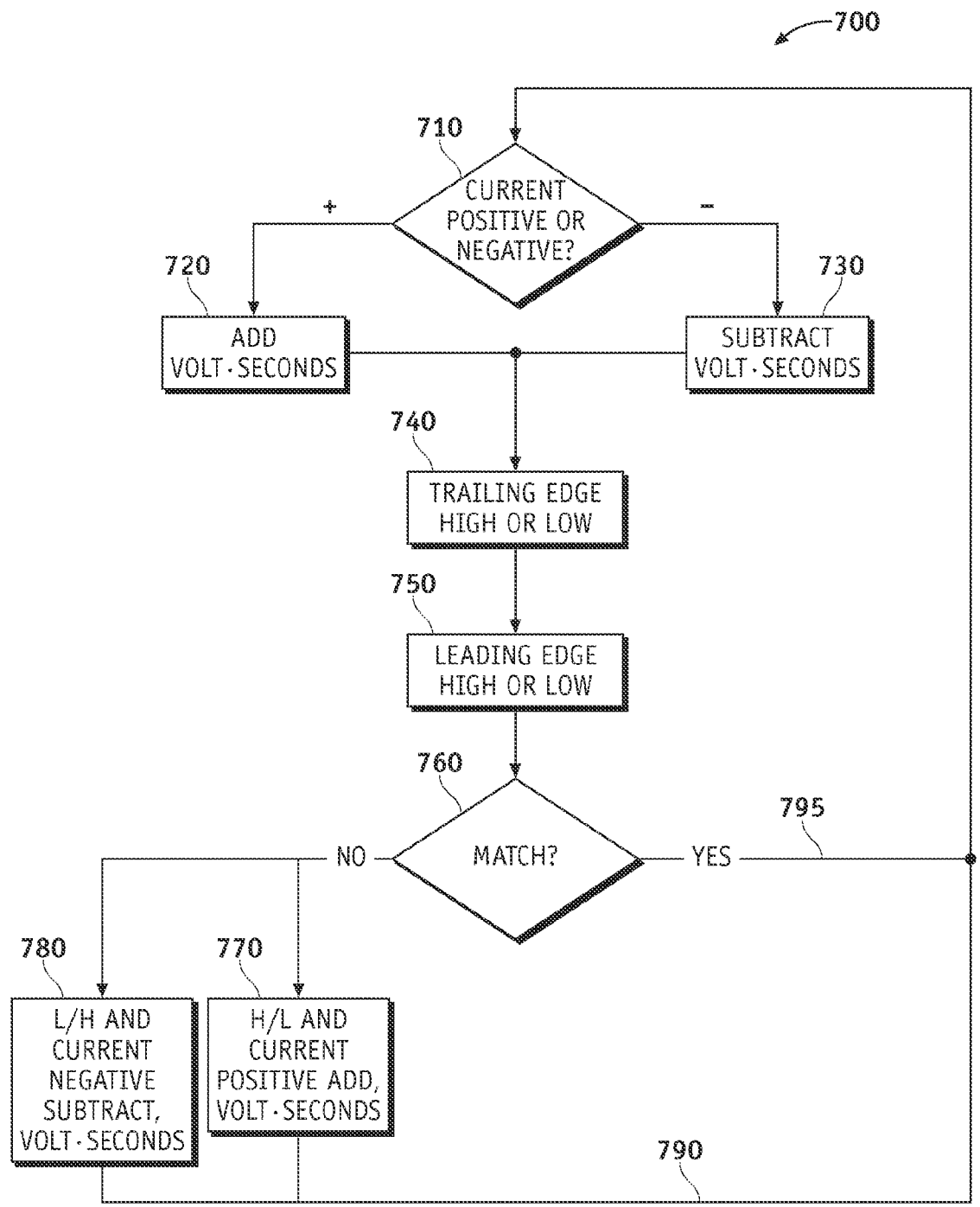
FIG. 7 is a flow diagram illustrating one embodiment of a method for compensating for a deviation in output voltage in the inverter of FIG. 1 when dead-time periods are utilized to prevent a shoot-through failure.

FIG. 7 is a flow diagram illustrating one embodiment of a method 700 for compensating for a deviation in output voltage in an inverter (e.g., inverter 100) when dead-time periods are utilized to prevent a shoot-through failure. In accordance with one embodiment, method 700 initiates by determining whether the current at node 130 is positive or negative when a current carrier signal arrives at inverter 100 (step 710).

When the current at node 130 is positive, in one embodiment, method 700 includes adding volt•seconds to the input signal of inverter 100 (step 720). When the current from node 130 is negative, in one embodiment, method 700 includes subtracting volt•seconds from the input signal of inverter 100 (step 730).

Method 700, in another embodiment, includes determining whether the trailing edge of a previous carrier signal is high (i.e., a non-inverted carrier signal) or low (i.e., an inverted carrier signal) (step 740). Moreover, method 700 includes determining whether the leading edge of the current carrier signal is high or low (step 750), and comparing the two carrier signals to determine if the carrier signals are the same or different types of carrier signals (i.e., match) (step 760). In other words, method 700 determines if the previous carrier signal and the current carrier signal are both non-inverted carrier signals or are both inverted carrier signals.

When the trailing edge of the previous carrier signal and the leading edge of the current carrier signal are different edge types (i.e., the current carrier signal is a non-inverted carrier signal and the previous carrier signal was an inverted carrier signal or the current carrier signal is an inverted carrier signal and the previous carrier signal was a non-inverted carrier signal), method 700 includes adding volt•seconds to the input of inverter 100 when the trailing edge of the previous carrier signal was a high edge and the leading edge of the current signal is a low edge and current at node 130 is positive (step 770), or subtracting volt•seconds from the input of inverter 100 when the trailing edge of the previous carrier signal was a low edge and the leading edge of the current carrier signal is a high edge and the current at node 130 is negative (step 780). In other words, method 700 includes adding volt•seconds to the input signal of inverter 100 when the previous carrier signal was a non-inverted carrier signal and the current carrier signal is an inverted carrier signal and the current at node 130 is positive (i.e., step 770), or subtracting volt•seconds from the input signal to inverter 100 when the previous carrier signal was an inverted carrier signal and the next carrier signal is a non-inverted carrier signal and the current at node 130 is negative (i.e., step 780). Essentially, method 700 adjusts the commanded output of volt•seconds to inverter 100, based on current polarity, such that inverter 100 will produce a desired amount of volt•seconds after the dead-time is inserted.

After performing step 770 or step 780, in one embodiment, method 700 includes returning to step 710 for the next carrier signal after the current carrier signal (step 790). Moreover, at step 760 when the previous carrier signal and the current carrier signal are both the same type of carrier signal (i.e., are both non-inverted carrier signals or are both inverted carrier signals), method 700 includes returning to step 710 for the next carrier signal after the current carrier signal (step 795).

Figure 1:
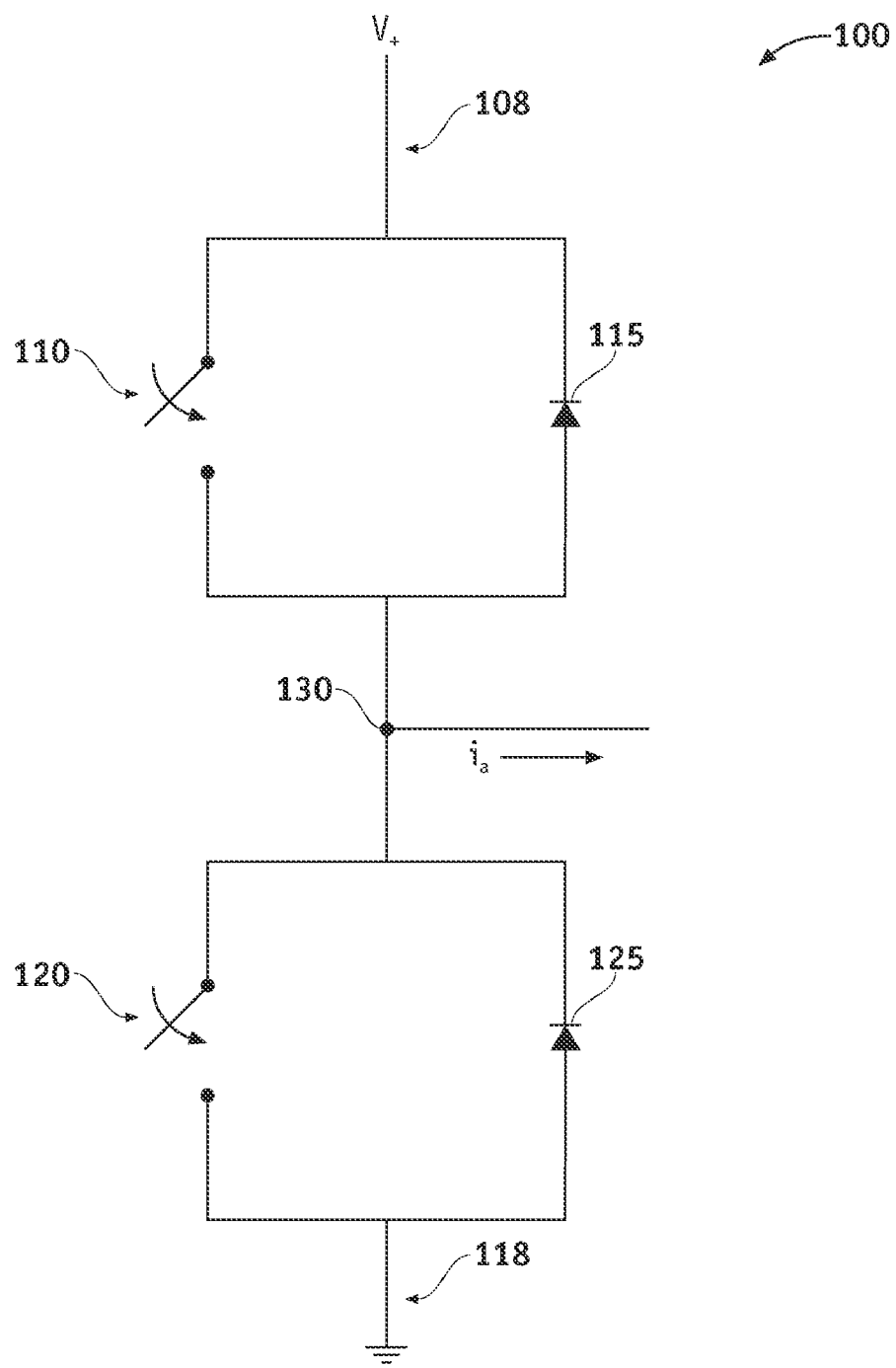
FIG. 1 is a diagram of a prior art inverter having a phase leg configuration.
Figure 2:
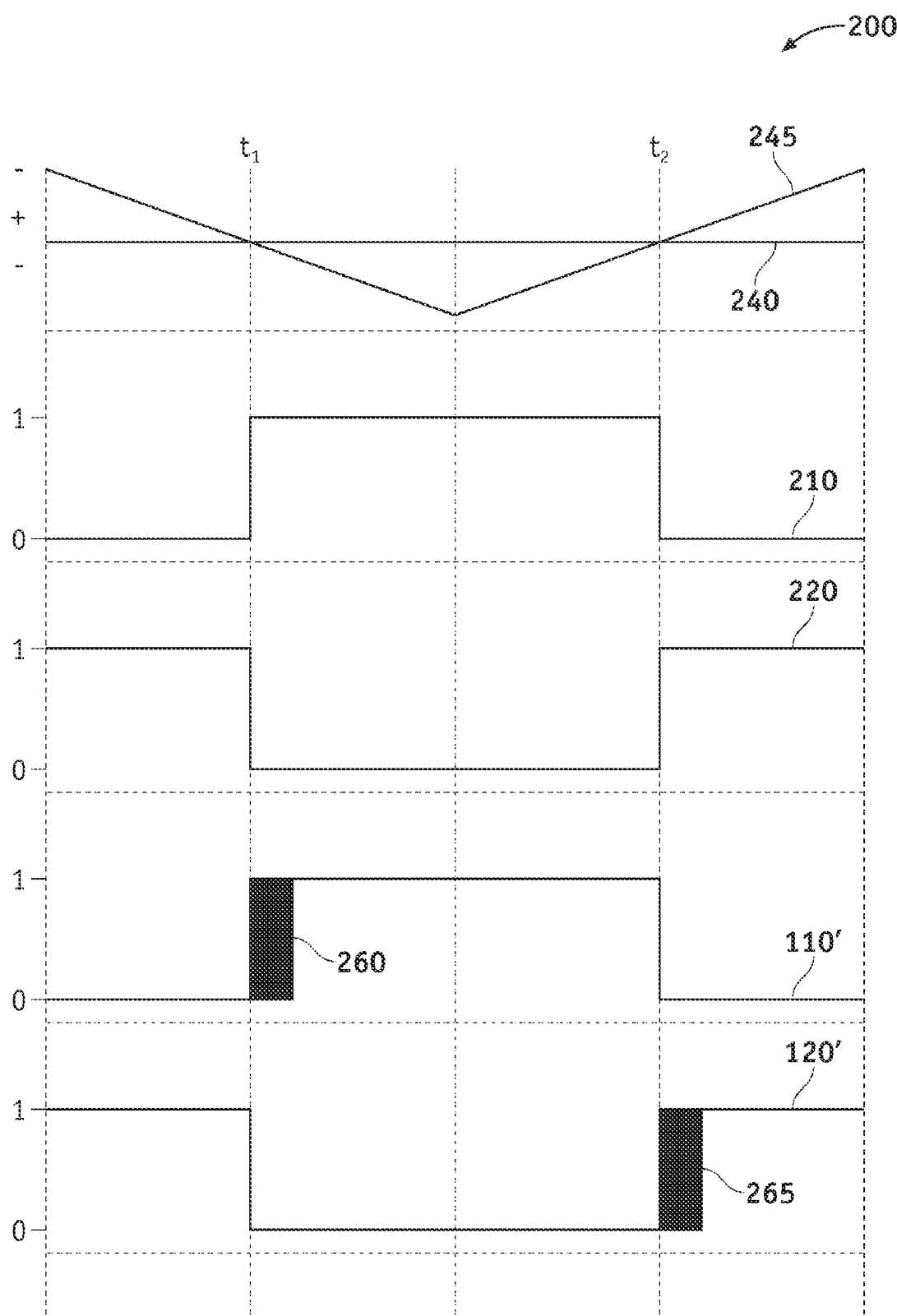
FIG. 2 is a timing diagram illustrating a representation of a prior art dead-time insertion method for the inverter of FIG. 1 having a non-inverted carrier signal.
Figure 3:
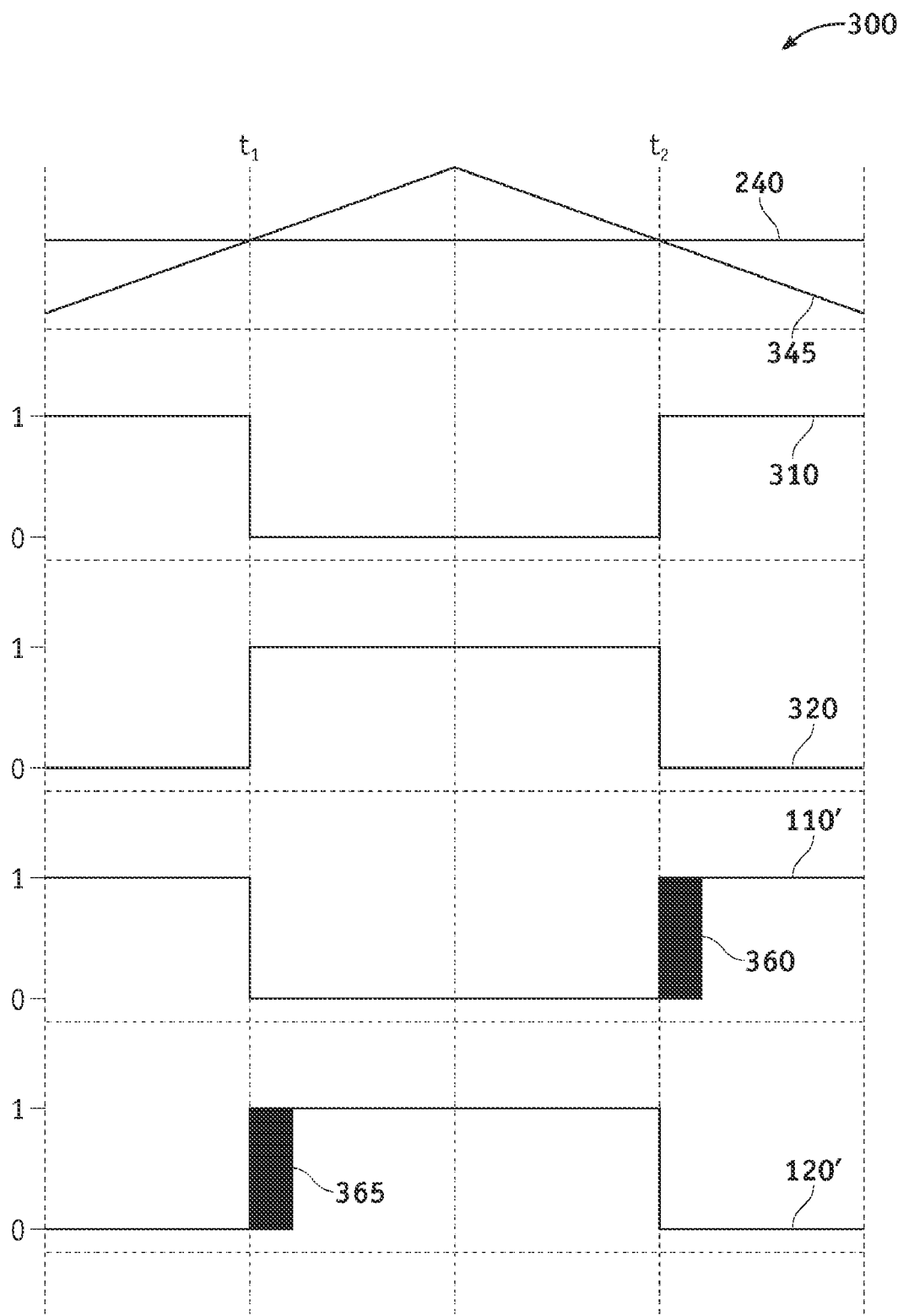
FIG. 3 is a timing diagram illustrating a representation of a prior art dead-time insertion method for the inverter of FIG. 1 having an inverted carrier signal.
Figure 4:
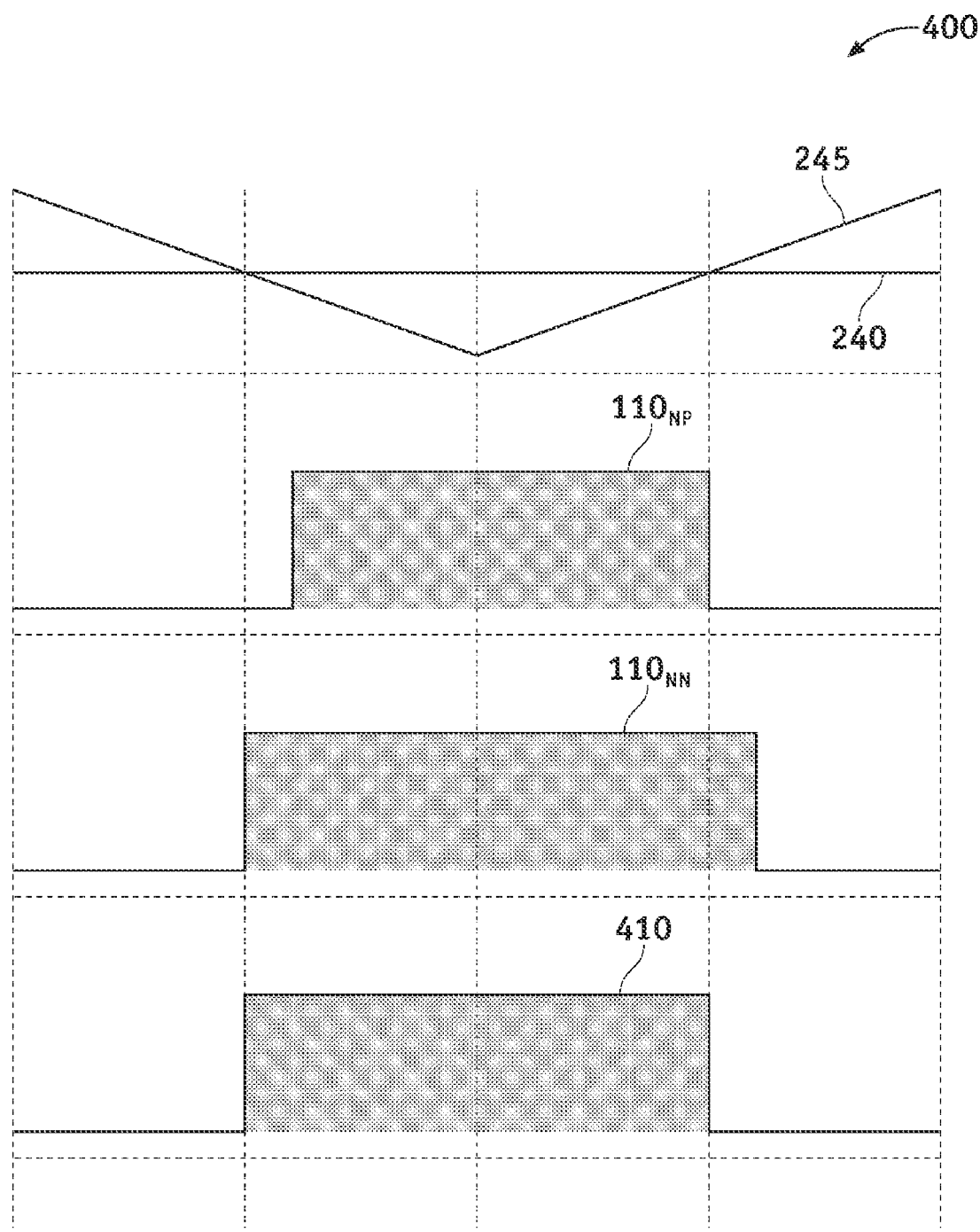
FIG. 4 is a timing diagram illustrating a representation of the voltage output for the dead-time insertion methods of FIG. 2.
Figure 5:
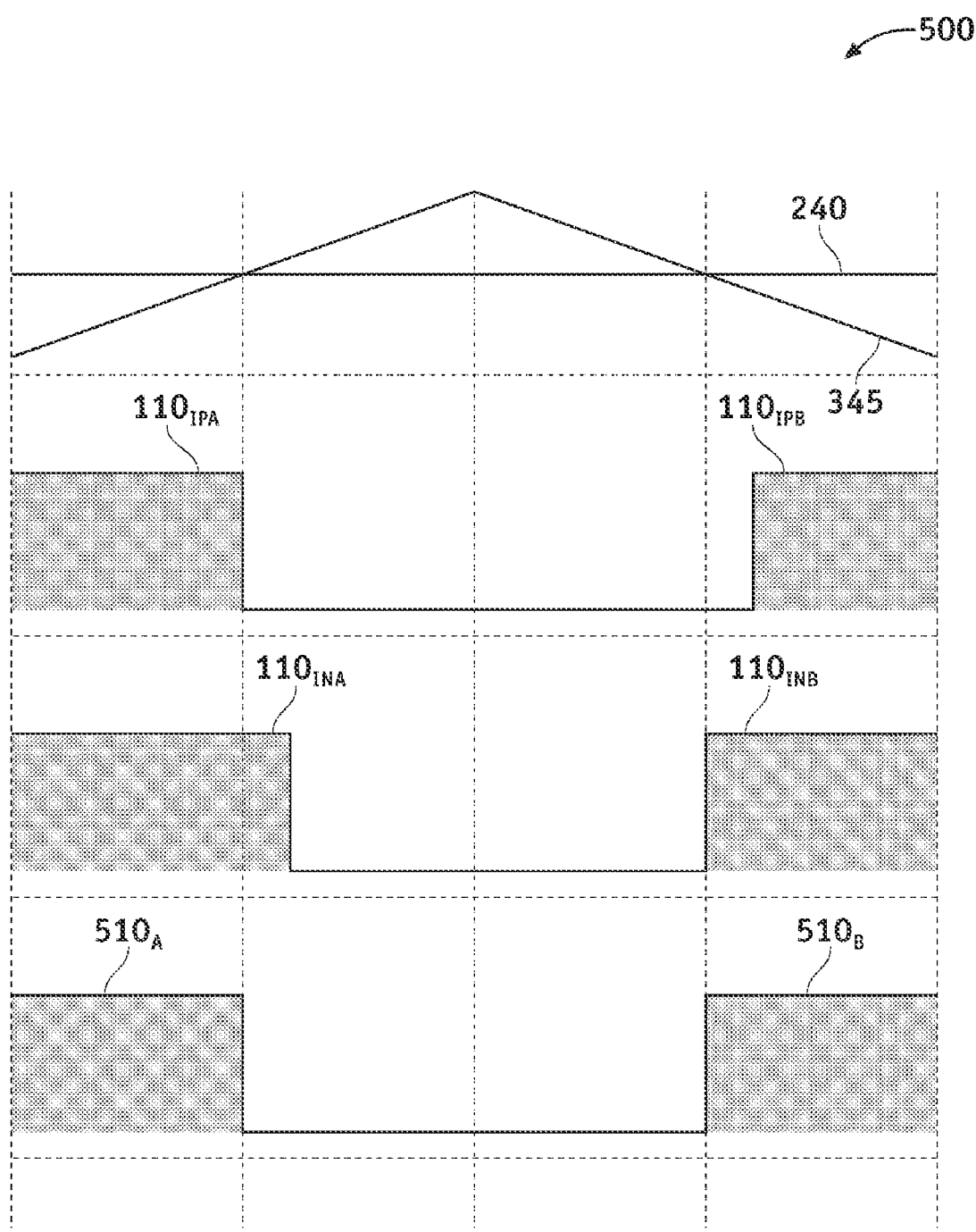
FIG. 5 is a timing diagram illustrating a representation of the voltage output for the dead-time insertion methods of FIG. 3.
Figure 6:
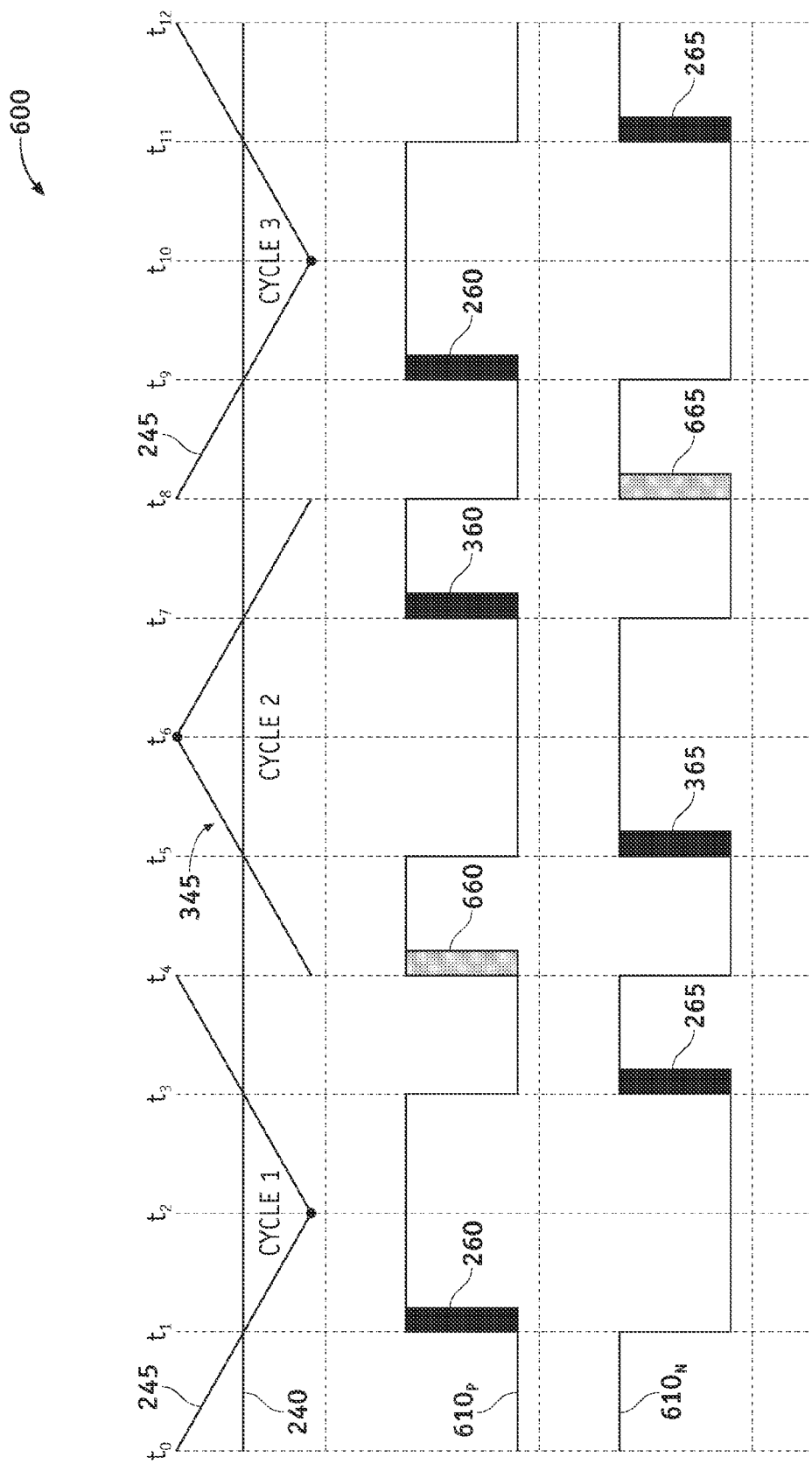
FIG. 6 is a timing diagram illustrating a representation of a prior art dead-time insertion method for the inverter of FIG. 1 when the carrier signal transitions between a non-inverted carrier signal and an inverted carrier signal, which results in a deviation from a desired output voltage of the inverter.

Notably, method 700 includes implementing a dead-time method in inverter 100 similar to the dead-time methods discussed above with reference to FIG. 2, 3, and/or 6. Moreover, a desired voltage output (in volt•seconds) is pre-determined by multiplying the volts by the amount of time switch 110 and/or 120 will be ON.

Figure 8:
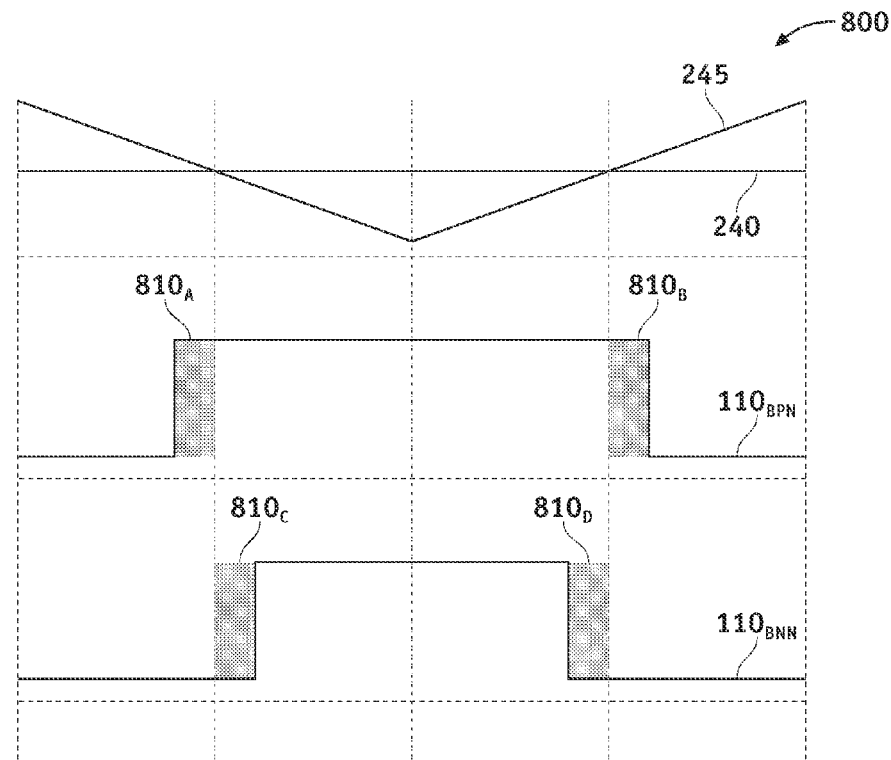
FIG. 8 is a timing diagram illustrating a representation of one embodiment of a method for compensating for a voltage output deviation when preventing a shoot-through failure in the inverter of FIG. 1 utilizing dead-time periods when the carrier signal is a non-inverted signal.

FIG. 8 is a timing diagram 800 illustrating a representation of one embodiment of method 700 for an input signal $110_{BPN}$ to inverter 100 when the carrier signal is a non-inverted carrier signal (e.g., carrier signal 245). As illustrated, method 800 includes adding volt•seconds (represented by added input portions $810_A$ and $810_B$) to input signal $110_{BPN}$ when the carrier signal is carrier signal 245 and the current at node 130 is positive. Moreover, method 800 includes subtracting volt•seconds (represented by subtracted input portions $810_C$ and $810_D$) to input signal $100_{BNN}$ when the carrier signal is carrier signal 245 and the current at node 130 is negative.

Notably, although FIG. 8 illustrates added input portions $810_A$ and $810_B$ as being symmetrically added on each side of input signal $110_{BPN}$, various embodiments contemplate that added input portions $810_A$ and $810_B$ may each be added to the same side of input signal $110_{BPN}$. Likewise, although FIG. 8 illustrates subtracted input portions $810_C$ and $810_D$ as being symmetrically subtracted from each side of input signal $110_{BNN}$, various embodiments contemplate that subtracted input portions 810C and 810D may each be subtracted from the same side of input signal $110_{BNN}$.

Figure 9:
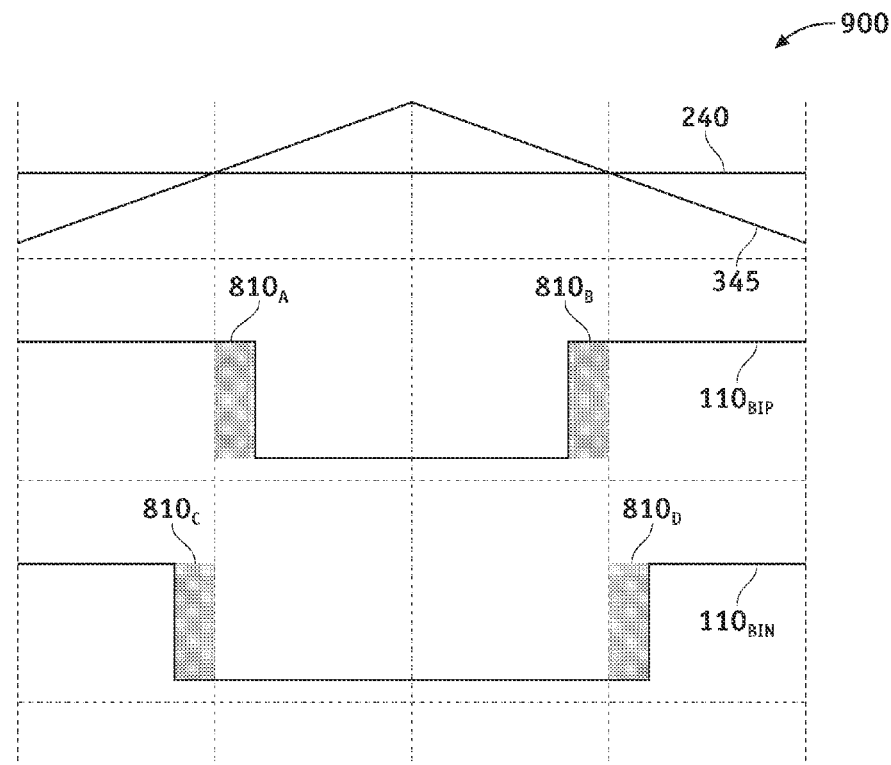
FIG. 9 is a timing diagram illustrating a representation of one embodiment of a method for compensating for a deviation in output voltage when preventing a shoot-through failure in the inverter of FIG. 1 utilizing dead-time periods when the carrier signal is an inverted signal.

FIG. 9 is a timing diagram 900 illustrating a representation of another embodiment of method 700 for an input signal $110_{BIP}$ to inverter 100 when the carrier signal is an inverted carrier signal (e.g., carrier signal 345). As illustrated, method 900 includes adding volt•seconds (represented by added input portions $810_A$ and $810_B$) to input signal $110_{BIP}$ when the carrier signal is carrier signal 345 and the current at node 130 is positive. Moreover, method 800 includes subtracting volt•seconds (represented by subtracted input portions $810_C$ and $810_D$) to input signal $110_{BIN}$ when the carrier signal is carrier signal 345 and the current at node 130 is negative.

Notably, although FIG. 9 illustrates added input portions $810_A$ and $810_B$ as being symmetrically added on each side of input signal $110_{BIN}$, various embodiments contemplate that added input portions $810_A$ and $810_B$ may each be added to the same side of input signal $110_{BIN}$. Likewise, although FIG. 9 illustrates subtracted input portions $810_C$ and $810_D$ as being symmetrically subtracted from each side of input signal $110_{BIN}$, various embodiments contemplate that subtracted input portions $910_C$ and $910_D$ may each be subtracted from the same side of input signal $110_{BIN}$.

Figure 10:
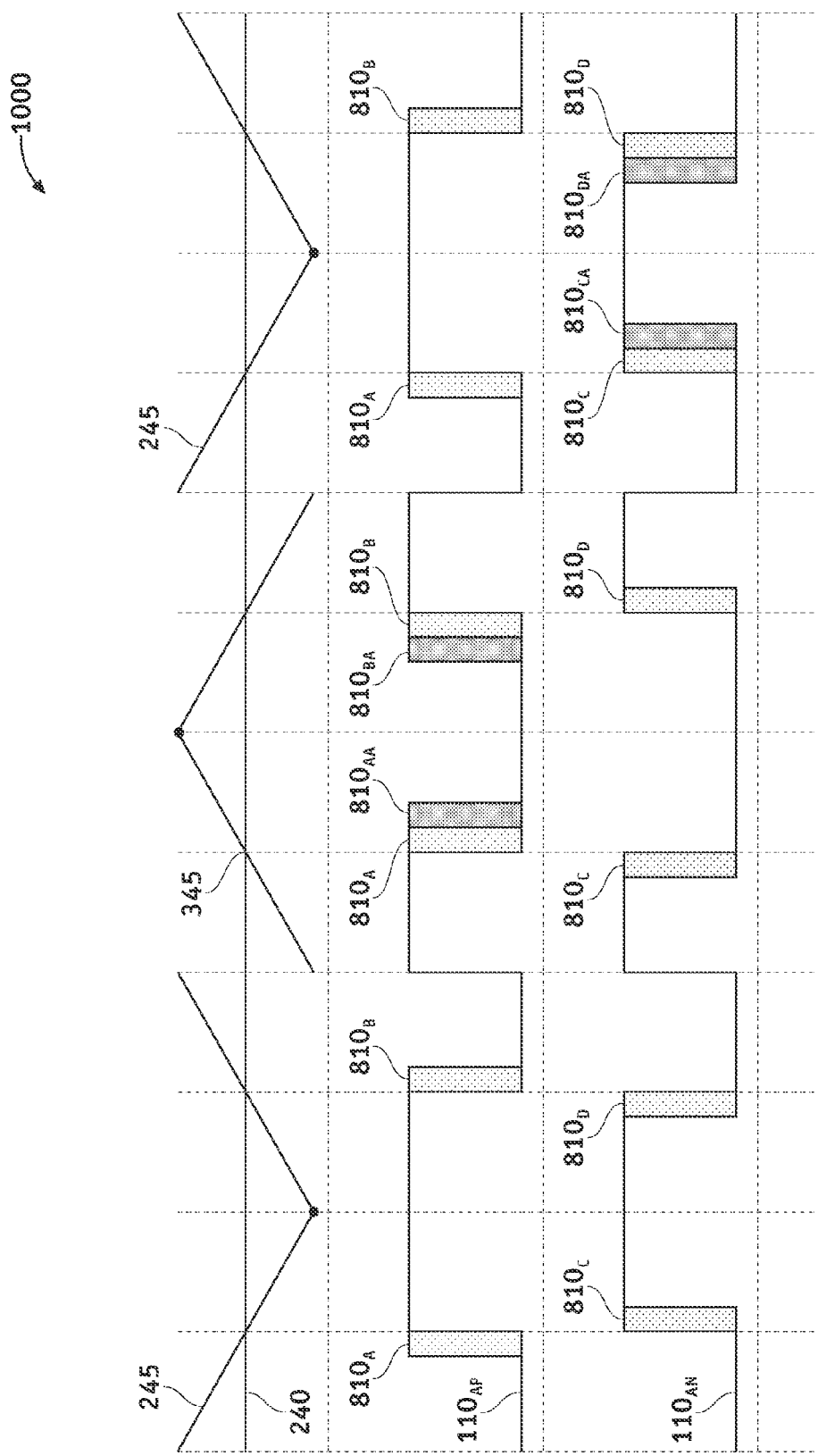
FIG. 10 is a timing diagram illustrating a representation of one embodiment of a method for compensating for a deviation in output voltage when preventing a shoot-through failure in the inverter of FIG. 1 utilizing dead-time periods when the carrier signal transitions between non-inverted carrier signals and inverted carrier signals.

FIG. 10 is a timing diagram 1000 illustrating a representation of one embodiment of method 700 for an input signal $110_{AP}$ (positive current at node 130) and input signal $110_{AN}$ (negative current at node 130) to inverter 100 when the carrier signal transitions between non-inverted carrier signals (e.g., carrier signal 245) and inverted carrier signals (e.g., carrier signal 345). As illustrated, method 1000 includes adding volt•seconds (represented by added input portions $810_A$ and $810_B$) to input signal $110_{AP}$ when the carrier signal is carrier signal 245. Moreover, method 1000 includes subtracting volt•seconds (represented by subtracted input portions $810_C$ and $810_D$) to input signal $110_{AN}$ when the carrier signal is carrier signal 245.

In addition, input signal $110_{AP}$ illustrates that when the carrier signal transitions from carrier signal 245 to carrier signal 345, additional volt•seconds (represented by added input portions $810_{AA}$ and $810_{BA}$) are added to input signal $110_{AN}$ (see e.g., cycle 2) in addition to added input portions $810_A$ and $810_B$. Moreover, input signal $110_{AN}$ illustrates that when the carrier signal transitions from carrier signal 345 to carrier signal 245, additional volt•seconds (represented by subtracted input portions $810_{CA}$ and $810_{DA}$) are subtracted from input signal $110_{AN}$ (see e.g., cycle 3) in addition to subtracted input portions $810_C$ and $810_D$.

Notably, although FIG. 10 illustrates added input portions $810_A$, $810_{BA}$, $810_{AA}$, and $810_{BA}$ as being symmetrically added on each side of input signal $110_{AP}$, various embodiments contemplate that added input portions $810_A$, $810_{BA}$, $810_{AA}$, and $810_{BA}$ may each be added to the same side of input signal $110_{AP}$ or added asymmetrically to each side of signal $110_{AP}$. Likewise, although FIG. 10 illustrates subtracted input portions $810_C$, $810_C$, $810_{CA}$, and $810_{DA}$ as being symmetrically added on each side of input signal $110_{BNN}$, various embodiments contemplate that subtracted input portions $810_C$, $810_D$, $810_{CA}$, and $810_{DA}$ may each be subtracted from the same side of input signal $110_{AN}$ or subtracted asymmetrically from each side of signal $110_{AN}$.

Figure 11:
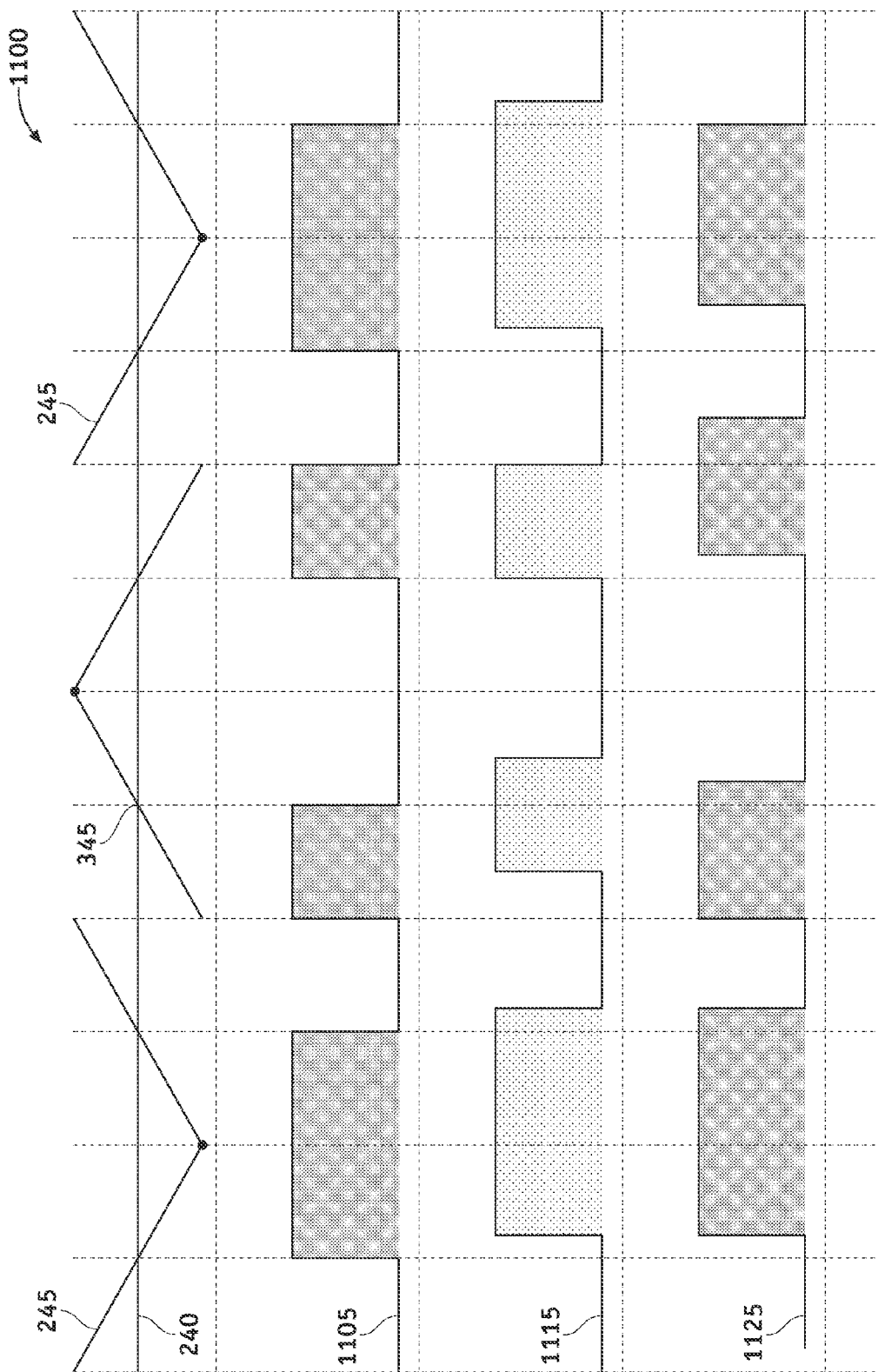
FIG. 11 is a timing diagram of the voltage output for the inverter of FIG. 1 implementing the methods represented by FIGS. 7-10.

FIG. 11 is a timing diagram 1100 illustrating a representation of the voltage output of inverter 100 when implementing method 700. Diagram 1100 includes a representation of an ideal voltage output 1105 of an ideal inverter. Moreover, diagram 1100 includes a representation of a voltage output 1115 for positive current at node 130 and a voltage output 1125 for negative current at node 130 for inverter 100 when utilizing method 700.

As illustrated, although voltage outputs 1115 and 1125 do not occur at the same time as ideal voltage output 1105 in cycles 1-3, the average voltage output of voltage outputs 1115 and 1125 for each of cycles 1-3 is substantially the same amount of output as ideal voltage output 1105. Accordingly, method 700 provides a dead-time compensation method in which inverters (e.g., inverter 100) utilizing dead-time periods to prevent a shoot-through failure are able to output substantially the same amount of average voltage as an ideal inverter.

Various embodiments of the above methods may be stored as executable instructions stored on computer-readable medium which, when executed by a processor coupled to inverter 100, cause the processor to perform such methods. Examples of computer-readable mediums include, but are not limited to, cache memory, a read-only memory, volatile random-access memory, non-volatile memory, and removable storage mediums such a disks, flash memory devices, and the like removable devices.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method to compensate for dead-time in an inverter including a first switch and a second switch and a node disposed between the first switch and the second switch, the method comprising the steps of:
   (a) inserting a dead-time period prior to actuating ON the first switch and the second switch;
   (b) pre-determining an amount of output in volt•seconds for the inverter;
   (c) determining an input signal including a pulse width for the inverter, wherein the output is based on the pulse width, and the pulse width is based on:
   a first carrier signal including a first pulse sequence,
   a second carrier signal including a second pulse sequence, wherein the first pulse sequence and the second pulse sequence are each one of a non-inverted pulse sequence and an inverted pulse sequence, and
   a polarity of current at the node, wherein the polarity is one of positive and negative;
   (d) adding a first amount of pulse width to the input signal when the current polarity is positive;
   (e) subtracting a second amount of pulse width from the input signal when the current polarity is negative; and
   (f) determining if a second amount of pulse width needs to be one of added to and subtracted from the input signal.

2. The method of claim 1, wherein (f) comprises the steps of:
   (g) comparing the first carrier signal to the second carrier signal to determine if the first carrier signal and the second carrier signal are the same type of carrier signal.

3. The method of claim 2, further comprising the step of:
   (h) transmitting the output signal if the first carrier signal and the second carrier signal are the same type of carrier signal.

4. The method of claim 3, further comprising the step of:
   (i) adding a third amount of pulse width to the input signal if the first carrier signal is a non-inverted carrier signal and the second carrier signal is an inverted carrier signal to increase the amount of volt.

5. The method of claim 4, further comprising the steps of:
   (j) subtracting a fourth amount of pulse width from the input signal if the first carrier signal is an inverted carrier signal and the second carrier signal is a non-inverted carrier signal; and
   (k) transmitting the output signal.

6. The method of claim 5, wherein (d) comprises:
   adding the first amount of pulse width to the input signal to increase the amount of output a first amount of added volt•seconds such that the output includes the pre-determined amount.

7. The method of claim 6, wherein (e) comprises:
   subtracting the second amount of pulse width from the input signal to decrease the amount of output a first amount of subtracted volt•seconds such that the output includes the pre-determined amount.

8. The method of claim 7, wherein (i) comprises:
   adding the third amount of pulse width to the input signal to increase the amount of output a second amount of added volt•seconds such that the output includes the pre-determined amount.

9. The method of claim 8, wherein (j) comprises:
   subtracting the fourth amount of pulse width from the input signal to decrease the amount of output a second amount of subtracted volt•seconds such that the output includes the pre-determined amount.

10. The method of claim 4, further comprising the steps of:
    repeating steps (c)-(f) for a third carrier signal compared to the second carrier signal.

11. A computer-readable medium storing executable computer program instructions which, when executed by a processor, cause the processor to perform a method to compensate for dead-time in an inverter comprising the steps of:
    (a) inserting a dead-time period prior to actuating ON the first switch and the second switch;
    (b) pre-determining an amount of output in volt•seconds for the inverter;
    (c) determining input signal including a pulse width for the inverter, wherein the output is based on the pulse width and the pulse width is based on:
    a first carrier signal including a first pulse sequence,
    a second carrier signal including a second pulse sequence, wherein the first pulse sequence and the second pulse sequence are each one of a non-inverted pulse sequence and an inverted pulse sequence, and
    a polarity of current at the node, wherein the polarity is one of positive and negative;
    (d) adding a first amount of pulse width to the input signal when the current polarity is positive;

(e) subtracting a second amount of pulse width from the input signal when the current polarity is negative; and (f) determining if a second amount of pulse width needs to be one of added to and subtracted from the input signal.

12. The computer-readable medium of claim 11, wherein the instructions to perform (f) further comprise instructions to perform the step of:

(g) comparing the first carrier signal to the second carrier signal to determine if the first carrier signal and the second carrier signal are the same type of carrier signal.

13. The computer-readable medium of claim 12, further comprising instructions to perform the step of:

(h) transmitting the output signal if the first carrier signal and the second carrier signal are the same type of carrier signal.

14. The computer-readable medium of claim 13, further comprising instructions to perform the step of:

(i) adding a third amount of pulse width to the input signal if the first carrier signal is a non-inverted carrier signal and the second carrier signal is an inverted carrier signal to increase the amount of volt.

15. The computer-readable medium of claim 14, further comprising instructions to perform the steps of:

(j) subtracting a fourth amount of pulse width from the input signal if the first carrier signal is an inverted carrier signal and the second carrier signal is a non-inverted carrier signal; and (k) transmitting the output signal.

16. The computer-readable medium of claim 15, wherein the instructions to perform (d) further comprise instructions to perform the step of:

adding the first amount of pulse width to the input signal to increase the amount of output a first amount of added volt•seconds such that the output includes the pre-determined amount.

17. The computer-readable medium of claim 16, wherein the instructions to perform (e) further comprise instructions to perform the step of:

subtracting the second amount of pulse width from the input signal to decrease the amount of output a first amount of subtracted volt•seconds such that the output includes the pre-determined amount.

18. The computer-readable medium of claim 17, wherein the instructions to perform (i) further comprise instructions to perform the step of:

adding the third amount of pulse width to the input signal to increase the amount of output a second amount of added volt•seconds such that the output includes the pre-determined amount.

19. The computer-readable medium of claim 18, wherein the instructions to perform (j) further comprise instructions to perform the step of:

subtracting the fourth amount of pulse width from the input signal to decrease the amount of output a second amount of subtracted volt•seconds such that the output includes the pre-determined amount.

20. The computer-readable medium of claim 14, further comprising instructions to perform the step of:

repeating steps (c)-(f) for a third carrier signal compared to the second carrier signal.

* * * * *